United States Patent
Kanzow et al.

(10) Patent No.: US 12,234,888 B2
(45) Date of Patent: Feb. 25, 2025

(54) V-RIBBED BELT

(71) Applicant: ContiTech Antriebssysteme GmbH, Hannover (DE)

(72) Inventors: Henning Kanzow, Wedemark (DE); Stephanie Kautz, Hannover (DE); Roman Gaska, Sehnde OT Hoever (DE)

(73) Assignee: ContiTech Deutschland GmbH, Hannover (DE)

( * ) Notice: Subject to any disclaimer, the term of this patent is extended or adjusted under 35 U.S.C. 154(b) by 0 days.

(21) Appl. No.: 18/547,356

(22) PCT Filed: Jan. 14, 2022

(86) PCT No.: PCT/DE2022/200000
§ 371 (c)(1),
(2) Date: Aug. 22, 2023

(87) PCT Pub. No.: WO2022/179667
PCT Pub. Date: Sep. 1, 2022

(65) Prior Publication Data
US 2024/0183427 A1      Jun. 6, 2024

(30) Foreign Application Priority Data
Feb. 23, 2021   (DE) .................... 10 2021 201 705.3

(51) Int. Cl.
*F16G 5/20*      (2006.01)

(52) U.S. Cl.
CPC .................................. *F16G 5/20* (2013.01)

(58) Field of Classification Search
CPC ........................................................ F16G 5/20
See application file for complete search history.

(56) References Cited

U.S. PATENT DOCUMENTS

| | | | | |
|---|---|---|---|---|
| 3,724,284 | A * | 4/1973 | Eng ........................... | F16G 5/04 474/267 |
| 3,828,585 | A * | 8/1974 | Thorneburg ........... | A41B 11/00 66/182 |
| 3,839,116 | A | 10/1974 | Thomas et al. | |
| 3,981,206 | A | 9/1976 | Miranti, Jr. et al. | |
| 4,027,545 | A | 6/1977 | White, Jr. | |
| 6,572,505 | B1 | 6/2003 | Knutson | |
| 8,262,523 | B2 | 9/2012 | Kanzow et al. | |
| 9,709,128 | B2 * | 7/2017 | Fleck ........................ | F16G 5/08 |
| 9,927,002 | B2 * | 3/2018 | Kim ........................... | F16G 1/12 |
| 10,060,506 | B2 * | 8/2018 | Kanzow ..................... | F16G 5/08 |
| 10,138,981 | B2 * | 11/2018 | Mitsutomi ........... | D03D 1/0094 |
| 10,436,285 | B2 | 10/2019 | Takehara et al. | |
| 2011/0269588 | A1 * | 11/2011 | Fleck ........................ | F16G 1/10 474/260 |
| 2012/0115658 | A1 * | 5/2012 | Kanzow .................. | D02G 3/447 474/260 |
| 2015/0087456 | A1 * | 3/2015 | Baltes ....................... | F16G 5/08 474/266 |
| 2016/0010722 | A1 * | 1/2016 | Kim .......................... | F16G 5/08 474/271 |
| 2016/0273616 | A1 * | 9/2016 | Takehara ................. | F16G 1/00 |
| 2017/0009847 | A1 | 1/2017 | Mitsutomi | |
| 2017/0045116 | A1 * | 2/2017 | Kobayashi ............... | F16G 1/08 |
| 2017/0045117 | A1 * | 2/2017 | Casagrande ............. | F16G 5/20 |
| 2017/0058995 | A1 * | 3/2017 | Kim ....................... | B29C 43/021 |
| 2017/0058996 | A1 * | 3/2017 | Kim ......................... | F16G 5/20 |
| 2019/0309452 | A1 * | 10/2019 | Liao ........................ | D04B 1/123 |
| 2020/0248780 | A1 * | 8/2020 | Kanzow .................... | F16G 1/10 |
| 2020/0362941 | A1 * | 11/2020 | Takechi .................. | D03D 1/00 |

FOREIGN PATENT DOCUMENTS

| | | |
|---|---|---|
| DE | 102006007509 A1 | 8/2007 |
| DE | 102007042917 A1 | 3/2009 |
| DE | 102008037561 A1 | 5/2010 |
| DE | 112014001531 T5 | 12/2015 |
| DE | 102017219339 A1 | 5/2019 |
| DE | 102017223383 A1 | 6/2019 |
| DE | 102021205665 A1 | 12/2022 |
| EP | 1992837 B1 | 3/2014 |
| EP | 3015738 A1 | 5/2016 |
| EP | 2981735 B1 | 11/2020 |

OTHER PUBLICATIONS

International Search Report dated May 9, 2022 of International Application PCT/DE2022/200000 on which this application is based.
European Patent Office Intention to Grant dated Sep. 20, 2024 for the counterpart European Patent Application No. 22 705 013.5 and machine translation of same.
EPO Communication re: Objections of a Third Party dated Nov. 19, 2024 for the counterpart European Patent Application No. 22 705 013.5.
European Patent Office Examination Report dated Dec. 20, 2024 for the counterpart European Patent Application No. 22 705 013.5 and machine translation of same.

* cited by examiner

*Primary Examiner* — Michael R Mansen
*Assistant Examiner* — Mark K Buse
(74) *Attorney, Agent, or Firm* — Richard A. Wolf; Gregory Adams

(57) ABSTRACT

A V-ribbed belt having an elastic main body constructed from at least one rubber mixture including an outer ply as a belt backing and a substructure having a ribbed force-transmitting side. To improve friction and optimize service life the V-ribbed belt has a coating made of a knitted fabric on its force-transmitting side, in which the average basis weight of the textile before vulcanization is between 140 and 190 g/m$^2$.

14 Claims, No Drawings

V-RIBBED BELT

The present invention relates to a V-ribbed belt having an elastic main body constructed from at least one rubber mixture comprising an outer ply as a belt backing and a ribbed substructure having a force-transmitting side.

In the functional state V-ribbed belts are usually endless loops and are used in the accessory equipment of motor vehicles having internal combustion engines for driving the generator/alternator for example. Excessive noise during operation must be avoided. A particularly unpleasant noise is the chirp noise that occurs when the pulleys in the V-ribbed belt drive are not in the same plane, i.e. are offset, or are out of alignment due to bearing wear for example.

Since these misalignments cannot be avoided in many V-ribbed belt drives, most V-ribbed belts are provided with a special surface on the ribbed functional side. In particular, textile coatings or textile coverings on the functional side have proven effective for suppressing chirp noise. However, the textile coatings or textile coverings have the disadvantage that they reduce friction. Too little friction results in too much slippage and thus in energy transmission losses which can cause the belt to heat up and markedly reduce the service life of the belt.

Textile coverings/textile coatings, in particular for V-ribbed belts, are well known.

Thus for example U.S. Pat. No. 3,839,116 A discloses a process for producing molded V-ribbed belts in which an elastic fabric is applied to the ribbed functional side.

U.S. Pat. No. 3,981,206 A describes a V-ribbed belt in which a two-sidedly stretchable textile made of knitted threads is vulcanized into the surface in the molding process, the textile used being a combination yarn made of filaments of elastic polyurethane and polyamide wound around one another. U.S. Pat. No. 4,027,545 A specifies the use of such V-ribbed belts and describes special settings for these belts.

DE102006007509 A1 discloses V-ribbed belts with warp knitted fabric as the rib coating which is composed of polyamide yarn and polyurethane knitted (Charmeuse knit) so as to form independent networks.

DE102007042917 A1 describes V-ribbed belts having a textile covering made of staple fibers, especially made of cotton. Although cotton coatings are good in terms of their noise characteristics, they exhibit poor abrasion resistance for demanding applications.

DE112014001531T5 discloses V-ribbed belts with a jersey knit as the textile covering, wherein the right side of the knitted fabric ("front side") is preferably disposed on the outside of the ribs and the mesh longitudinal direction is preferably in the belt circumferential direction. The knitted fabric consists of wool-enhanced yarns of polyamide, polyester, cotton and nylon fibers or wrap-spun yarns with elastic polyurethane as the core yarn. These wrap-spun yarns are costly and complex to produce, thus significantly increasing the overall costs of the belt.

However, the recited examples have the problem that the described textile coatings usually exhibit insufficient friction, i.e. have an insufficient coefficient of friction (CoF), for use in motor vehicles.

It is accordingly an object of the present invention to provide a V-ribbed belt having a textile covering/a textile coating which has sufficient friction and can ensure a longest possible service life, especially in the form of a good bending fatigue resistance, of the belt. In addition the textile coating/the textile covering must have sufficient abrasion resistance for use in a motor vehicle and provide good protection against chirp noise. The belt shall further be manufacturable in a cost-effective manner.

This object is achieved when the V-ribbed belt has a coating made of a textile on its force-transmitting side, wherein the average basis weight of the textile before vulcanization is between 140 and 190 g/m$^2$.

The basis weight of the textile is determined according to DIN EN 12127, version 1997-12.

It has surprisingly been found that the friction, the noise characteristics and the service life of the belt, in particular the bending fatigue resistance, can be improved when said belt is provided with a textile covering having an average basis weight before vulcanization of between 140 and 190 g/m$^2$.

For simplicity the terms textile covering and textile coatings are used synonymously hereinbelow.

According to the invention the textile covering is a knitted fabric having an average basis weight before vulcanization of between 140 g/m$^2$ to 190 g/m$^2$, preferably between 145 to 170 g/m$^2$.

A knitted fabric is a sheetlike material produced from one or more threads or from one or more thread systems by mesh formation.

This surprisingly achieves a good compromise between low material usage, thus relatively low production costs, and good noise characteristics.

The average basis weights according to the invention accordingly make it possible to employ an open-pored knitted fabric as the textile covering, thus simultaneously having a positive effect on friction and service life.

The knitted fabric is preferably a single jersey. It is further preferred when the wrong side of the textile faces outwards. This results in a more uniform surface and better long-term durability. The mesh structures "right side" and "wrong side" are shown for example in the textile technology book "Wirkerei und Strickerei" by Klaus Peter Weber and Marcus Weber, Melliand, 4th edition, 2004, pages 14, 15.

For better manufacturability the mesh longitudinal direction of the textile may be largely parallel to the circumferential direction of the belt.

As a consequence of the open-pored nature of the textile covering, the surface area of the force-transmitting zone is preferably covered by the threads or the thread systems of the textile covering to an extent of less than 40% based on the total surface area of the force-transmitting zone.

More than 60% of the surface area of the force-transmitting zone based on the total surface area thereof is thus composed of the material of the substructure.

The textile covering according to the invention may in principle employ any natural or synthetic material alone or in combination. However, it is preferable when the textile is formed from a combination of a multifilament yarn made of polyamide, preferably PA 6 or PA 6.6, particularly preferably PA6, and an elastic thread. The elastic thread is characterized in that it has an elongation at break according to DIN EN ISO 2062:1995 of more than 100%.

A typical example of such elastic threads are threads that are composed of at least 85% by weight of polyurethane and are known as "elastane" or, in anglophone countries, as "spandex".

The textile covering is preferably knitted by plated knitting, which represents a particularly efficient and cost-effective way of knitting. It is preferable when the elastic thread is disposed on the wrong side since this achieves greater adhesion between the textile and the elastomeric main body.

The multifilament yarn may be a textured yarn to optimize the extensibility.

The weight fraction of the elastic thread in the textile covering is advantageously between 8% and 16% by weight. This ensures sufficient extensibility and good processability.

In addition, for good long-term durability and simplicity of production, the V-ribbed belt can have an open textile splice which is perpendicular to the belt circumferential direction and consists only of the elastomeric material of the substructure and preferably has a width of 0.5 to 6 mm.

The belt preferably has a PK profile according to ISO 9981 with a profile depth of 2.2 to 2.6 mm. Belts having a lower profile depth tend to exhibit excessive slippage and to have poorer wear resistance. An excessive profile depth gives the belt an excessive total thickness, thus reducing its bending fatigue resistance.

The elastic main body is preferably based on at least one rubber mixture. The rubber mixture of the main body contains at least one rubber component.

Employed rubber components especially include ethylene-propylene rubber (EPM), ethylene-propylene-diene rubber (EPDM), (partially) hydrogenated nitrile rubber (HNBR), fluororubber (FKM), natural rubber (NR), styrene-butadiene rubber (SBR) or butadiene rubber (BR) which are unblended or blended with at least one further rubber component, in particular with one of the abovementioned rubber types, for example in the form of an EPM/EPDM or SBR/BR blend. According to the present invention the substructure with the force-transmitting side especially employs EPM or EPDM or an EPM/EPDM blend. In a preferred embodiment the EPM, EPDM or the blend of EPM and EPDM is peroxidically crosslinked.

The rubber mixture of the main body further contains at least one filler. This is advantageously at least one carbon black or at least one silica. The combination of carbon black and silica has proven particularly suitable. Employable silicas include all silicas known in the rubber industry, preferably precipitated silicas. It is likewise possible to employ all known carbon black types, in particular furnace and thermal carbon blacks such as SAF, SCF, HAF, FF, FEF, XCF, HMF, GPF, SRF, MPF, FT or MT, wherein FEF carbon blacks are particularly preferred.

The mixture ingredients of the rubber mixture additionally comprise at least one crosslinker or a crosslinker system (crosslinking agent and accelerator). Further mixture ingredients typically further include processing auxiliaries and/or plasticizers and/or aging stabilizers and optionally further additives, for example reinforcing fibers and color pigments. However, a fiber-free mixture is preferred. Reference is made in this connection to the general prior art in rubber mixture technology.

To strike a good balance between the bending fatigue resistance of the belt and abrasion resistance, in an advantageous embodiment the rubber mixture of the main body has a post-vulcanization shore A hardness according to DIN ISO 7619-1 (February 2012) of between 70 and 90, preferably between 75 and 87.

The invention is now to be illustrated in detail with reference to comparative examples and working examples, which are summarized in table 1.

Produced for all examples was a V-ribbed belt having a main body based on a peroxidically crosslinked fiber-free rubber mixture comprising 100 phr of EPDM both for the outer ply and for the substructure. The Shore A hardness of the vulcanized mixture according to DIN ISO 7619-1 (February 2012) was 79.

The V-ribbed belts investigated are 6PK belts having a length of 1330 mm and have a PK profile with a profile depth of 2.3 mm.

The coefficient of friction (CoF according to SAE_J_2432) was determined.

A CoF value between 1.45 and 1.85 is considered good. Belts with lower values usually cannot transmit enough power for many applications. CoF values greater than 1.85 tend to be noisy especially during startup of the engine.

A hot bending fatigue test (HBW) was additionally performed. During the HBW test, the V-ribbed belts are tested for long-term durability (bending fatigue) and heat aging with daily visual inspection of the belts.

V-ribbed belts usually show first cracks and then chunk-outs after a certain running time in the course of the HBW test. A value of more than 250 h is specified as the target specification. The test was in each case terminated when three or more cracks or one or more chunk-outs were observed in the substructure in the inspection to be performed daily. The test was a five-pulley test (drive pulley diameter=60 mm, additional pulleys=50 mm) based on the VDA hot bending fatigue test (version of Sep. 27, 2005), which in turn uses 9 pulleys. The test was carried out at a constant 130° C. ambient temperature.

A noise test was additionally performed where the noise characteristics in case of pulley offset were investigated. The noise test rig has a ribbed drive pulley having a diameter of 130 mm. Following in the load run is an unprofiled deflection pulley having a diameter of 65 mm and a ribbed pulley of 60 mm diameter and a driven pulley of 50 mm diameter. The belts were tensioned with a run force of 330 N and driven by the drive pulley at 1000 revolutions per minute. The drive pulley itself is driven by an electric motor via a cardan joint, thus ensuring uneven movement of the drive pulley. When performing the noise test, the ribbed pulley is deflected forward from the zero position perpendicular to the V-ribbed belt drive, thus resulting in an offset between the profiled pulleys in the V-ribbed belt drive. As a result, the run of the belt between the deflection pulley and the profiled pulley is deflected out of the plane enclosed by the belt by an angle α, thus causing some belts to produce a chirping noise. Belts that exhibited no noise even when misaligned by up to 2° were rated as good "+". Belts that exhibited no noise at up to 1.5° but noise at 2° were rated as satisfactory "o". Belts that already develop noise at less than 1.5° of misalignment were rated as poor "−" in terms of noise.

It is apparent from table 1 that the best results are achieved with knitted fabric 4, i.e. with a jersey knit knitted by plated knitting from PA6 and PU (elastane) (with the wrong side on the outside and the PU on the wrong side), having a basis weight of 156 g/m². Particularly surprising are the differences in the HBW running times, where the advantage of PA6 over a knitted fabric composed of cotton and elastane is apparent.

TABLE 1

| | Textile structure | Material | Filament yarn to elastane in % by weight | Linear density of main yarn | Basis weight [g/m²] | CoF | HBW run time | Noise characteristics |
|---|---|---|---|---|---|---|---|---|
| 1 | Charmeuse warp knitted fabric | PA6/PU | 80:20 | 44 dtex | 155 | 1.73 | 240 h | + |
| 2 | Jersey knit | PA6/PU | 87:13 | 110 dtex | 128 | 2.02 | 312 h | − |
| 3 | Jersey knit | PA6/PU | 87:13 | 110 dtex | 142 | 1.88 | 288 h | ○ |
| 4 | Jersey knit | PA6/PU | 87:13 | 110 dtex | 156 | 1.70 | 344 h | + |
| 5 | Jersey-knit | BW/PU | 91:9 | 147 dtex | 196 | 1.52 | 186 h | + |
| 6 | Jersey knit | BW/PU | 91:9 | 147 dtex | 103 | 1.65 | 206 h | + |
| 7 | Jersey knit | BW/PU | 91:9 | 147 dtex | 133 | 1.81 | 160 h | + |
| 8 | Jersey knit | BW/PU | 91:9 | 147 dtex | 195 | 1.75 | 179 h | + |

The invention claimed is:

1. A V-ribbed belt having an elastic main body constructed from at least one rubber mixture comprising an outer ply as a belt backing and a substructure having a ribbed force-transmitting side, wherein the ribbed force-transmitting side has a textile overlay including a knitted fabric, wherein the average basis weight of the textile before vulcanization is 140 g/m² to 190 g/m², and wherein the basis weight of the textile was determined according to DIN EN 12127, version 1997-12, wherein the ribbed force-transmitting side has coefficient of friction value between 1.45 and 1.85 as determined according to SAE J 2432.

2. The V-ribbed belt according to claim 1, wherein the average basis weight of the textile before vulcanization is 140 g/m² to 170 g/m².

3. The V-ribbed belt according to claim 1, wherein the knitted fabric is composed of a combination of a multifilament yarn made of polyamide and an elastic thread.

4. The V-ribbed belt according to claim 3, wherein the polyamide is PA 6 or PA 6.6.

5. The V-ribbed belt according to claim 3, wherein the elastic thread is composed of polyurethane.

6. The V-ribbed belt according to claim 1, wherein ethylene-propylene rubber (EPM) or ethylene-propylene-diene rubber (EPDM) or a combination of EPM and EPDM is employed as the rubber for the rubber mixture of the substructure.

7. The V-ribbed belt according to claim 1, wherein the rib depth is between 2.2 and 2.6 mm.

8. The V-ribbed belt according to claim 1, wherein the textile overlay is an open-pored knitted fabric.

9. The V-ribbed belt according to claim 8, wherein the knitted fabric is a single jersey.

10. The V-ribbed belt according to claim 1, wherein the textile overlay is knitted in a plated manner.

11. The V-ribbed belt according to claim 1, wherein:
the knitted fabric is composed of a combination of a multifilament yarn made of polyamide and an elastic thread,
the polyamide is PA 6 or PA 6.6,
the elastic thread is composed of polyurethane and has an elongation at break according to DIN EN ISO 2062: 1995 of more than 100%, and
the rib depth is between 2.2 and 2.6 mm.

12. The V-ribbed belt according to claim 1, wherein the textile overlay is a plated knitted fabric having polyamide yarns arranged in a first facing direction and elastane yarns arranged in a second facing direction opposite the first facing direction, and wherein the second facing direction with the elastane yarns is facing outwardly.

13. The V-ribbed belt according to claim 12, wherein a weight fraction of the elastane yarns in the textile covering is between 8% and 16% by weight, and a weight fraction of the polyamide yarns is between 84% and 92% by weight.

14. The V-ribbed belt according to claim 13, wherein the textile overlay has an open-pore structure, and a surface area of the force-transmitting zone is covered by threads of the textile covering to an extent of less than 40% based on the total surface area of the force-transmitting zone.

* * * * *